June 28, 1932. A. McL. NICOLSON 1,864,753
HIGH FREQUENCY SYNCHROSCOPE
Filed July 25, 1930
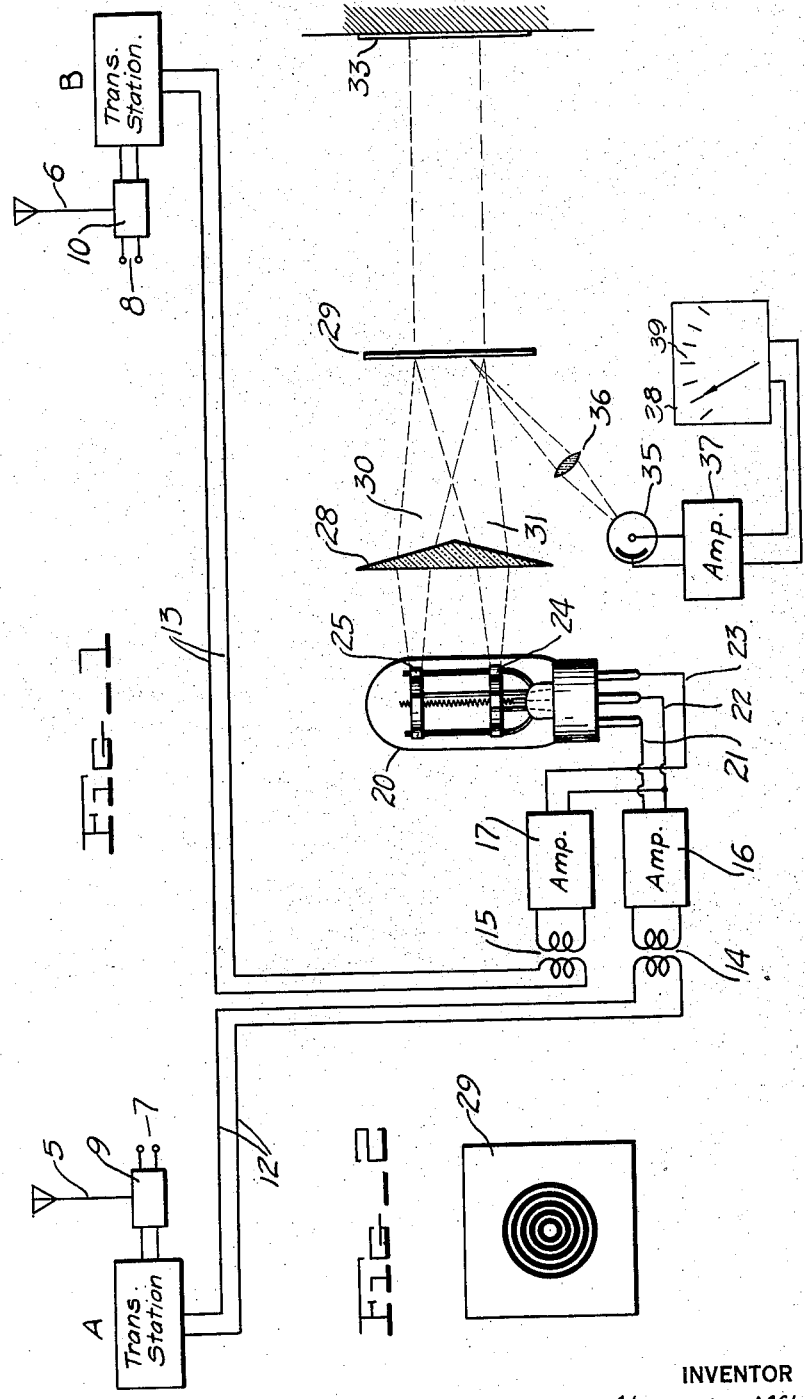
INVENTOR
Alexander McLean Nicolson
BY
ATTORNEY Patented June 28, 1932

1,864,753

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y., A CORPORATION OF DELAWARE

HIGH FREQUENCY SYNCHROSCOPE

Application filed July 25, 1930. Serial No. 470,699.

This invention relates to a method of and means for determining synchronism of two frequencies, and particularly to the measurement of the amount of phase shift between any two frequencies.

An object of this invention is to determine whether electrical impulses or frequencies are synchronized.

Another object of the invention is to accurately measure or determine the amount of phase displacement between electrical impulses or alternating currents of the same frequency when not synchronized.

In the generation of electrical power, especially alternating currents wherein several generators are connected in parallel with individual prime movers, it is essential that they be in the proper phase relationship when connected to a common line or load. This relationship is synchronism and is determined by various satisfactory methods such as by use of synchroscopes of a mechanical nature with a revolving pointer or, electrically with light or dark lamps. Although these methods of synchronizing are satisfactory for the low frequencies used on power lines, they are inadequate for frequencies in the neighborhood of 100,000 cycles and upward, such as used in carrier frequency communication work or by broadcast stations.

The present invention contemplates providing apparatus for determining synchronism between high frequency carrier currents or any electrical impulses of extremely high frequency. The invention may be utilized in broadcast systems wherein two or more stations are synchronized so as to employ the same broadcast carrier frequency. In such systems it becomes necessary to maintain each station on its common frequency at all times, and in order to do so, it is desirable to have means indicating when the stations are properly synchronized and, when not synchronized, the amount of the phase displacement between them.

The above objects of the invention are carried out by means of coherent light sources connected to the frequency sources, the synchronism of which is to be determined. Each individual light source produces by reflection, interfering light waves to produce light and dark areas. These areas are superimposed upon one another so that when the frequencies are in synchronism, the entire interference area may be either light or dark. Any change in phase displacement, however, produces alternations in the light and dark areas, which vary in intensity in proportion to the amount of the phase displacement between the frequencies. These alternations in light and dark intensities on the surface are detected by a photoelectric cell system which feeds an intensity meter calibrated to indicate the percentage the frequencies are off synchronism.

The light source used to produce interfering light waves may consist of a double point neon lamp producing monochromatic light, such as red, green, etc., or two similar lamps. The two point sources of the one lamp are contained in the same envelope having one common electrode, the other two electrodes being individual to the respective sources of currents whose synchronism is being determined.

The system is particularly adaptable to the synchronizing of exceptionally high frequencies wherein the eye is unable to follow variations in light, and in which any mechanical means is limited by the inertia of the various parts to comparatively low frequencies.

The details of the invention will be more fully understood by reference to the accompanying drawing in which;

Figure 1 represents diagrammatically two transmitting stations connected to the synchroscope apparatus of the invention, and Fig. 2 is a chart of the interference area produced by the light system.

Stations A and B shown in Fig. 1 may be either terminals of a two-way commercial communication system or individual broadcasting stations. These stations are shown with antenna systems 5 and 6 and wire transmission terminals 7 and 8, respectively, either means of transmission being chosen by operation of the switches 9 and 10.

Wire connecting lines 12 and 13 terminate at the point at which synchronization is to be determined, this point being at either station A or B, or at any intermediate point therebetween. These transmission lines transmit the carrier frequency only, and may be replaced by directional antenna systems of any well known type. The lines 12 and 13 terminate at input transformers 14 and 15 connected to their individual amplifiers 16 and 17, respectively. The outputs of the amplifiers are fed into a triple electrode neon tube 20 over conductors 21, 22 and 23, conductor 22 being common and connected to the common electrode of the neon tube, while conductors 21 and 23 are individual to anodes 24 and 25, respectively. This neon lamp may be replaced by two sources of coherent light, but a unitary structure is preferable. Monochromatic light is not required as white light will function, although the use of monochromatic light produces more contrast as the rings are alternate areas of light and the absence thereof, while a white light source produces colors in the interference area.

Current flowing in conductors 21 and 22 will produce light around electrode 24, while current flowing in conductors 22 and 23 will produce light around electrode 25. The light rays from both electrodes are projected through a triangular prismatic lens 28, which superimposes the rays from each source on a semi-transparent semi-opaque medium 29, as shown by the light ray envelopes 30 and 31. The emergent light rays from the medium 29 are projected on a fixed reflecting medium 33, which has the proper curvature to cause, by the reflected light therefrom, alternate light and dark areas on the medium 29 from any single light source. The elements of this interfering light system are so adjusted that the light areas of one interference system are superimposed upon the dark areas of the other interference system, so that when the impulses producing the light are in synchronism, the medium 29 will be lighted with a steady light. Any variation from synchronism, however, will produce fluctuations in this steady light in the interference area.

A photoelectric cell 35 is focussed on the interference area through a lens 36. This cell detects any fluctuations of light intensity, the effect of a phase displacement being an optical beat of light. The output of the cell is amplified by an amplifier 37, and the output thereof transmitted to an intensity alternating current meter 38. This meter may be any well known type of peak current meter used to measure comparatively low amplitudes. A scale 39 indicates the percentage of phase shift between the two frequencies after the meter has been calibrated. For instance, a full scale reading may indicate a 90° phase shift or 100% off frequency, while a 45° phase shift is 50% off frequency. The intensities of the light variations or optical beats produced on the medium 29 by the phase displacement of the two frequencies, are proportional to the phase displacement and will be indicated on the meter 38.

In Fig. 2, a chart is shown of the interference rings which are produced on medium 29 of Fig. 1 by each individual light source 24 or 25. This pattern may also be produced at any instant by both light sources when interference patterns are out of phase, the intensities of the variations of which determines the amount the frequencies are displaced.

The above described high frequency synchroscope system is also adaptable to lower frequencies than those employed in broadcast transmission, such as those used for carrier line work in the neighborhood of 26 kilocycles and upward.

Furthermore, by locating the syncnroscope at one station, the frequency of this station may be automatically controlled and adjusted magnetically or by temperature variation of a crystal. The photocell will then control work circuits which heat or cool the oscillating control element in accordance with the phase displacement, thus causing the controlled station frequency to follow the variations of the carrier at the distant station.

The use of the principle of interference light patterns of coherent light sources is adaptable to many uses in addition to the embodiment disclosed above, and the invention is to be limited only by the scope of the appended claims.

What is claimed is:

1. In combination, a plurality of frequency sources, means for producing a light from each of said sources, means for causing said lights to form in a definite pattern, and means for detecting said interference pattern.

2. In combination, two frequency sources, means for producing light rays from said sources, means for causing said rays to form light and dark areas, and means for detecting said areas.

3. A combination in accordance with claim 2, in which said last-mentioned means includes a photoelectric cell for detecting the changes in light and dark areas.

4. The method of determining synchronism between two frequencies comprising generating light waves with said frequencies, causing said light waves to form in a definite pattern, and detecting said pattern.

5. The method of determining the phase displacement between currents of two frequencies, which comprises generating light rays with each of said frequencies, forming interference patterns with each of said frequencies, and detecting the appearance and disappearance of said interference patterns.

6. The method of determining the phase displacement between two currents having the same frequency comprising generating a light pattern with each of said currents superimposing said patterns, and detecting the optical beats produced by the difference in said patterns in accordance with the phase displacement between said currents.

7. Synchroscopic apparatus comprising two sources of frequency, means for producing light from each of said sources, means for causing each of said lights to form alternating dark and light areas, and means for detecting the variations of said light and dark areas.

8. In combination, a plurality of frequency sources, a light producing means associated with each of said sources, light directing means for superimposing said light sources on a common medium, means associated with said medium for producing an interference light pattern, a photo-electric cell focussed on said interference light pattern, and means associated with said photoelectric cell for detecting the change in said interference pattern.

9. A combination in accordance with claim 8, in which said light producing means is calibrated to correctly indicate the phase shift between said frequencies.

10. In a sytem of the class described, two transmitting stations operating on carrier waves of the same frequency, transmission circuits for said carrier waves terminating at a common point, and means for determining synchronism between said waves, said means including interfernce light patterns produced by said waves.

11. In combination, two transmitting stations operating on carrier waves of the same frequency, transmission circuits for said carrier waves terminating at one of said stations, and means for obtaining the frequency of each of said stations in a light pattern the difference between said light patterns indicating the off synchronism of said stations.

12. A combination in accordance with claim 11, in which said last mentioned means includes superimposed interference light patterns and a photocell for detecting the difference between said patterns.

13. In combination, two transmitting stations operating on carrier waves of the same frequency, transmission circuits for said carrier waves terminating at a common point, a light source terminating each of said transmission circuits, said light sources being enclosed in a common envelope, and means for projecting said light to form superimposed interference light patterns, and means for detecting variations between said patterns.

14. In combination, a plurality of frequency sources, a light producing means for each of said sources, said light means being enclosed in a common envelope, light directing means for superimposing said light sources on a common medium, means associated with said medium for producing interfering light patterns, and a photoelectric cell for detecting changes in said light patterns.

Witness my hand this 23d day of July, 1930, at the city of Newark, in the county of Essex and State of New Jersey.

ALEXANDER McLEAN NICOLSON.